Patented Aug. 25, 1931

1,820,178

UNITED STATES PATENT OFFICE

ADDISON H. BEALE, OF PITTSBURGH, PENNSYLVANIA, AND HERMAN A. BRASSERT AND FRED WILLE, OF CHICAGO, ILLINOIS, ASSIGNORS, BY MESNE ASSIGNMENTS, TO A. M. BYERS COMPANY, OF PITTSBURGH, PENNSYLVANIA, A CORPORATION OF PENNSYLVANIA

METHOD OF PREPARING AND REMELTING SYNTHETIC SLAGS

No Drawing.    Application filed July 21, 1928. Serial No. 294,571.

Our invention relates to an improved process for making and remelting synthetic slags, and more particularly slags suitable for the Aston process of making wrought iron, such, for example, as described in several United States patents of James Aston, such as No. 1,370,507, granted March 8, 1930, for Method of making wrought iron pipe; No. 1,412,823, granted April 18, 1922, for Method of making wrought iron; and No. 1,469,373, granted October 2, 1923, for Manufacture of wrought iron.

In the practice of the Aston process it is of importance that the slag should be of a regular and uniform analysis and character corresponding to the most desirable type of puddling slag formed in the hand puddling process. By maintaining such a uniform quality of slag, the Aston wrought iron is of superior uniform quality compared to hand puddled iron where control of the slag is impossible.

In melting and re-melting the slag for the Aston process, a cupola was first used with solid fuel, such as coke; but the slag was not uniform in analysis and character. We have found that the coke reduces a portion of the iron oxides in the slag-forming materials charged, causing collection of metallic iron in the crucible or bottom of the cupola. This reduction of iron oxide increases the percentage of silica in the slag and may render it unsuitable for use in the Aston process. Owing to variations in fusion temperatures in the upper zones of the stock column in the cupola, in quantity and pressure of blast, in the moisture of the atmosphere, and other variables which are beyond control, the percentage of reduction of iron oxide varied, thus resulting in a variable slag.

The object of our invention is to provide a process of preparing synthetic slag and of re-melting slag which will give a substantially uniform product corresponding to the best slag obtained in hand puddling. In carrying out this method, reduction of the iron oxides is substantially prevented and the desirable proportion of silicates is thus retained in the slag.

In carrying out our process, we melt or re-melt the slag or slag-forming materials under a non-reducing atmosphere. A hearth furnace is preferably used, which may be of the open hearth, reverberatory or "air furnace" type, wherein a non-reducing flame is directed upon the charge and preferably no solid fuel is mixed with the charge.

The fuel employed may be such as gas, oil or powdered coal, the combustion taking place outside of the slag charge and not within the slag charge, as in the case of ordinary cupola practices using coke or other solid fuel. The carbon content of the fuel should be gasified by complete combustion with an excess of air, so that substantially none of the carbon will be absorbed by the bath and substantially no reduction of oxides in the bath will take place.

For purposes of economy, we prefer to preheat or partially or wholly melt the solid charge before the liquid bath of slag is collected on the hearth, preferably by using a vertical shaft furnace containing the slag-forming materials or slag to be re-melted, no coke or other solid fuel being used in the shaft furnace. The shaft will preferably be heated by the products of combustion passing through it from the hearth furnace and may be superposed upon such furnace. In this way, the hearth furnace need not be of the regenerative type, as the column of materials in the shaft furnace will take up much of the heat from the gases before they pass to the stack.

We may also employ a shaft furnace without connecting it directly to the hearth furnace; but in such case we direct the highly heated gases of combustion coming from a flame produced, for example, with oil, gas or powdered coal, into the hearth or crucible of the shaft, which may be of the cupola or blast furnace type.

Where such a shaft furnace is used, the charge of slag-forming materials or slag to be re-melted must be sufficiently coarse to be permeable to the ascending gases. This is preferably accomplished by charging a sufficient percentage of coarse solid materials, such as heating furnace cinder, coarse gravel, lump ore, or sintered ore. Such coarse material will provide sufficient voids for upward passage of the gases, thus replacing the solid coke ordinarily used in cupola furnaces, one function of which is to keep the charge open.

It will be understood that our method is applicable both to the forming of a synthetic slag and to the re-melting of slag, such as the slag squeezed from wrought iron balls, recovered from ladle skulls, or from other sources. In many cases the charge will consist of both new materials, such as iron ore, roll scale, mill cinder, puddling cinder, and other iron oxides, such as heating cinder, with silicates or silica such as gravel, quartzite, or sand, and of a proportion of cold slag to be re-melted.

The advantages of our invention result from the uniformity and high quality of the slag produced, which has a very material function in maintaining the high quality of wrought iron in the Aston process Our invention may be carried out by widely different apparatus, and changes may be made in the process without departing from our invention as set forth in the following claims.

We claim:

1. In the manufacture of wrought iron, the steps consisting of melting materials containing iron oxides and silica in desirable ratios in a hearth furnace, maintaining a non-reducing atmosphere therein to hold the material ratios substantially the same in the slag, pouring the molten product of a steel-making operation into portions of the molten substantially uniform slag, and forming welded wrought iron balls therein.

2. In the preparation of molten slag for wrought iron use, the step consisting of melting slag-forming materials to form a bath containing iron oxides and silicates in a hearth furnace in the substantial absence of carbon in the bath, and pre-heating slag materials by passing the gases of combustion from the hearth furnace over them.

3. In the melting of slag for wrought iron use, the steps consisting of charging the same into a shaft furnace, and melting the same therein by gases of combustion while substantially out of contact with carbon.

4. In the melting of slag for wrought iron use, the steps consisting in charging the same into a shaft furnace, providing a column therein of sufficient permeability to allow gases to pass up through it, and feeding hot gases of combustion upwardly through the charge under substantially non-reducing conditions and then melting the materials in a hearth furnace under a non-reducing atmosphere.

In testimony whereof we have hereunto set our hands.

ADDISON H. BEALE.
HERMAN A. BRASSERT.
FRED WILLE.